United States Patent
Lucas et al.

(10) Patent No.: US 11,820,891 B2
(45) Date of Patent: Nov. 21, 2023

(54) THERMOPLASTIC POLYMER COMPOSITION, METHOD FOR PREPARING SAME AND VIBRATION-DAMPING DEVICE INCORPORATING SAME

(71) Applicant: HUTCHINSON, Paris (FR)

(72) Inventors: Antoine Lucas, Montargis (FR); Marion Doudeau-Pirat, Chevillon sur Huillard (FR)

(73) Assignee: Hutchinson, Paris (FR)

( * ) Notice: Subject to any disclaimer, the term of this patent is extended or adjusted under 35 U.S.C. 154(b) by 163 days.

(21) Appl. No.: 16/952,290

(22) Filed: Nov. 19, 2020

(65) Prior Publication Data

US 2021/0147678 A1    May 20, 2021

(30) Foreign Application Priority Data

Nov. 20, 2019 (FR) .................... 19 12947

(51) Int. Cl.
| | |
|---|---|
| *C08L 77/10* | (2006.01) |
| *C08L 77/02* | (2006.01) |
| *B29C 45/00* | (2006.01) |
| *F16F 15/00* | (2006.01) |
| *B29K 77/00* | (2006.01) |
| *C08K 3/40* | (2006.01) |
| *C08K 7/14* | (2006.01) |

(52) U.S. Cl.
CPC .......... *C08L 77/10* (2013.01); *B29C 45/0001* (2013.01); *C08L 77/02* (2013.01); *F16F 15/00* (2013.01); *B29K 2077/10* (2013.01); *C08K 3/40* (2013.01); *C08K 7/14* (2013.01)

(58) Field of Classification Search
CPC .......... C08L 2205/02; C08L 2205/025; C08L 77/02; C08L 77/04; C08L 77/06
See application file for complete search history.

(56) References Cited

U.S. PATENT DOCUMENTS

| | | | | |
|---|---|---|---|---|
| 2016/0053091 A1* | 2/2016 | Nakagawa | ............... | C08K 3/04 524/607 |
| 2016/0278489 A1 | 9/2016 | Mizumoto | | |
| 2016/0355679 A1 | 12/2016 | Aepli | | |

FOREIGN PATENT DOCUMENTS

| | | |
|---|---|---|
| CN | 104448815 A | 3/2015 |
| JP | 2012111941 A * | 6/2012 |

OTHER PUBLICATIONS

JP 2012111941 A machine translation (Jun. 2012).*
The French Search Report, dated Jul. 3, 2020, in the related French Appl. No. 1912947.

* cited by examiner

*Primary Examiner* — Ana L. Woodward

(57) ABSTRACT

The invention relates to a thermoplastic polymer composition comprising polyamides, its preparation method and a device for a motor vehicle capable of damping vibrations. The composition (I1, I2, I3, I4) comprises
- an aliphatic polyamide
- a polyphthalamide coming from a C6-C12 aliphatic diamine and from an aromatic diacid comprising terephthalic acid, the aliphatic polyamide/polyphthalamide weight ratio being >1 and
- a reinforcing filler comprising glass fibers.

The composition has, after "RH50" conditioning, maximum tan delta values according to ISO 6721-5 between 60-90° C. and 1-3000 Hz, with
(i) tan delta >4.20% at 60° C. and/or
(ii) tan delta >4.00% at 80° C. and/or
(iii) tan delta >3.80% at 90° C.

34 Claims, 3 Drawing Sheets

THERMOPLASTIC POLYMER COMPOSITION, METHOD FOR PREPARING SAME AND VIBRATION-DAMPING DEVICE INCORPORATING SAME

CROSS-REFERENCE TO RELATED APPLICATIONS

This application claims priority from French Patent Application No. 19 12947 filed on Nov. 20, 2019. The French Patent Application is hereby expressly incorporated by reference herein in its entirety.

TECHNICAL FIELD

The invention relates to a thermoplastic polymer composition comprising an alloy of polyamides, its preparation method and a device for a motor vehicle capable of damping vibrations in particular in a range of frequencies ranging from 1 Hz to 3000 Hz and at a temperature between 60° C. and 90° C. The invention applies in particular to any structural part transmitting vibrations (for example received from the wheels of the vehicle), or to an antivibration support for a vehicle with a heat, hybrid or electric engine combining first and second rigid elements while damping vibrations between them and while supporting a load, such as a linking support connecting the engine to an element of the structure of the vehicle (e.g. its body), with it being specified that the invention applies to any anti-vibration or ground contact system of a motor vehicle subjected to vibrations in all or a part of the aforementioned ranges of frequencies and of temperatures and optionally also outside of these ranges.

PRIOR ART

In a known manner, the bodies of brake calipers and the arms of engine mounts for motor vehicles are made from a metal material for example containing aluminum or magnesium. These metal structural parts have in general satisfactory mechanical properties, but the disadvantage of being relatively heavy and of providing weak damping of the vibrations while driving, in particular at a frequency ranging from 1 to 3000 Hz and at a temperature between 60 and 90° C.

JP 4 441 855 B2 discloses a rigid item for a motor vehicle accessory resistant to vibrations, which has a flexural modulus ranging from 13 to 25 GPa and a melt flow index ranging from 4.0 to 50.0 g/10 min, measured at 275° C. under a mass of 2160 g. The composition of the item comprises a crystalline polyamide such as a PA 66, a smaller quantity by weight of another polyamide such as a polyphthalamide for example having the name "MXD6" (poly(m-xylylene adipamide) coming from an aromatic diamine), a polypropylene for example modified by maleic acid as a compatibilizing agent and, as a reinforcing filler, glass fibers combined with at least one other filler such as Wollastonite.

DISCLOSURE OF THE INVENTION

One goal of the present invention is to propose a thermoplastic polymer composition with strong mechanical and anti-vibration performance that overcomes in particular the aforementioned disadvantages while having, with respect to a control composition consisting of the same aliphatic polyamide reinforced identically by glass fibers (e.g. control composition called "PA66 GF50", "PA6 GF50" or "PA6 GF35" when the aliphatic polyamide is a PA 6 or a PA 66 and with 50% or 35% by weight of glass fibers), improved damping at frequencies characterizing the stresses applied in particular to any structural part transmitting vibrations for example received from the wheels of a motor vehicle, or to any anti-vibration support in a motor vehicle such as the aforementioned linking support between the engine and an element of the structure of the vehicle for example such as its body, while having mechanical properties at least equal to those of the corresponding control composition.

This goal is achieved in that the Applicant has discovered in an unexpected manner during their research that, if an alloy of an aliphatic polyamide and of a specific polyphthalamide coming at least partly from an aliphatic diamine having from 6 to 12 atoms of carbon and from an aromatic carboxylic acid comprising terephthalic acid according to an aliphatic polyamide/polyphthalamide weight ratio greater than 1 is used in combination with glass fibers, then a damping quantified by values of tan delta (measured by dynamic mechanical analysis both dry and after conditioning in a humid atmosphere of the RH50 type) that is very clearly improved over a frequency range from 1 to 3000 Hz at temperatures between 60 and 90° C., and static mechanical properties measured both at 23° C. and at 120° C. that are superior or at least preserved, with respect to said corresponding control composition, can be obtained.

Thus, according to a first aspect of the invention, a thermoplastic polymer composition according to the invention comprises:
 at least one aliphatic polyamide,
 at least one polyphthalamide coming at least partly from an aliphatic diamine having from 6 to 12 atoms of carbon and from an aromatic dicarboxylic acid comprising terephthalic acid, the weight ratio of said at least one aliphatic polyamide to said at least one polyphthalamide being greater than 1, and
 a reinforcing filler comprising glass fibers.

According to this first aspect of the invention, the composition has, after conditioning in air at 50% relative humidity (RH50), tan delta values measured by dynamic mechanical analysis (DMA) according to the standard ISO 6721-5 on rectangular test pieces 34.81 mm long, 4 mm wide and 2 mm thick, by frequency sweeps ranging from 0.1 Hz to 20 Hz and with an amplitude of deformation of 2.5 µm, for example by plateaus of 5° C. over a temperature range ranging from Tg−60° C. to Tg+60° C., said values of tan delta, obtained by the principle of time-temperature superposition, being maximum at a temperature between 60° C. and 90° C. in a range of frequencies ranging from 1 Hz to 3000 Hz, and satisfying at least one of the following conditions (i), (ii), (iii), for at least one frequency of said range of frequencies inclusively between 1 Hz and 3000 Hz:
 (i) tan delta >4.20% at 60° C.,
 (ii) tan delta >4.00% at 80° C.,
 (iii) tan delta >3.80% at 90° C.

"Aliphatic polyamide" (PA in abbreviated form) means in a known manner in the present description a homopolymer or copolymer polyamide obtained by reaction of at least one diamine for example having 4 to 10 atoms of carbon and of at least one aliphatic dicarboxylic acid for example having 6 to 12 atoms of carbon. Said at least one diamine can be of the aliphatic type with a linear, branched or cyclo-aliphatic (i.e. alicyclic) chain, preferably being linear. Said at least one aliphatic dicarboxylic acid can also have a linear, branched or cyclo-aliphatic chain, preferably being linear.

Preferably, said at least one aliphatic polyamide according to the invention is chosen from the group consisting of PA 6.6 (also called PA 66 below), PA 6, PA 11, PA 12, PA 6/66, PA 4.6, PA 5.6, PA 6.9, PA 6.10, PA 6.12, PA 10.10, PA 10.12 and the mixtures of at least two of these PAs.

Even more preferably, said at least one aliphatic polyamide comprises:
- a PA 66, in which case the composition of the invention is particularly usable for a motor vehicle with a heat engine with said values of tan delta being maximum between 70 and 90° C. (given that the standard temperature for such a vehicle usually varies between 70 and 90° C. for a maximum temperature of 120° C.), and/or
- a PA 6, in which case the composition of the invention is particularly usable for an electric motor vehicle with said values of tan delta being maximum between 60 and 90° C. (given that the standard temperature for such a vehicle is typically approximately 65° C. for a maximum temperature of 85° C.).

"Polyphthalamide" (PPA in abbreviated form) means in the present description, in accordance with the standard ASTM D5336, a polyamide in which the dicarboxylic acid portion of the repeating units in the polymer chain contains a total molar concentration of terephthalic acid (TPA) and of isophthalic acid (IPA) at least equal to 55%. Thus, a polyphthalamide is in a known manner a "semi-aromatic" polyamide that is obtained by the reaction of a diamine with an aromatic dicarboxylic acid.

Said at least one polyphthalamide according to the invention is preferably semi-crystalline, thus being by definition such that said dicarboxylic acid portion contains a molar concentration of isophthalic acid (IPA) at most equal to 55%, preferably inclusively between 0 and 50% and even more preferably of 0% (i.e. without IPA), with it being specified that a PPA in an amorphous alternative such as PA 6T/6I can be used in a composition of the invention, as explained below.

Said at least one polyphthalamide according to the invention can be:
- a semi-aromatic polyamide homopolymer having a macrostructure coming from a specifically aliphatic diamine having from 6 to 12 atoms of carbon (thus excluding the aromatic diamines such as those from which the aforementioned "MXD6" comes) and from an aromatic dicarboxylic acid comprising terephthalic acid, or
- a copolymer (i.e. semi-aromatic copolyamide) combining with the above macrostructure another semi-aromatic polyamide unit X coming from an aliphatic diamine having from 6 to 12 atoms of carbon and from an aromatic dicarboxylic acid comprising terephthalic or isophthalic acid.

"Filler" means in the present description one or more individual reinforcement-grade filler(s) for the alloy of polyamides according to the invention, which is/are dispersed homogenously in the composition, with it being specified that the reinforcing filler according to the invention comprises said glass fibers as an inorganic reinforcing filler.

The aforementioned conditioning in air at 50% relative humidity (RH50) that was used to characterize the compositions of the invention is a protocol derived from the standard ISO 1110 and defined by the Applicant by implementing the following four steps, specifically for H2 test pieces:
- the H2 test pieces were dried for 4 hours at 80° C. and they were weighed (initial state="DAM" for "dry as molded");
- the test pieces were then left in a climate chamber for 20 hours at 50° C. and 95% humidity in order to saturate them with water, and they were weighed (state saturated with water);
- the test pieces were weighed every day until their weight stabilized (variation in weight of less than 0.1% from one day to another), which corresponds to stabilized conditioning in RH50 humidity; and
- the percentage of humidity absorption was then calculated by comparing the weight of the stabilized test pieces to the weight of the dry test pieces.

It is noted that the "DMA" measurement protocol used to obtain the values of tan delta (i.e. tangent δ) uses a "dual cantilever" mounting according to the standard ISO 6721-5 from 1996 revised in 2019 (flexural vibration—non-resonance method), while being based on the general principles disclosed in the standard ISO 6721-1. This measurement protocol implements said frequency sweeps with said amplitude of deformation on said rectangular test pieces over said range of temperatures with respect to the temperature Tg of the composition (the Tg of each composition tested in the present description was measured by this same "dual cantilever" "DMA" technique via said rectangular test pieces having the aforementioned dimensions by temperature sweeps at 2.5 μm of deformation, at a frequency f of 1 Hz and with a ramp of 3° C./minute). Said principle of time-temperature superposition called "TTS" was then used to construct index contours covering the frequency range of interest from 1 to 3000 Hz at the desired temperatures.

It is also noted that these specific damping characteristics common to the compositions according to the invention make them usable for forming all or a part of a vibration-damping device for a motor vehicle, such as a motor vehicle with a heat, hybrid or electric engine, and this device can be said structural part transmitting vibrations (e.g. receives from the wheels of the vehicle) or said anti-vibration support combining first and combining first and second rigid elements while damping vibrations between them and while supporting a load (e.g. a linking support connecting the engine to an element of the structure of the vehicle such as its body), as a partial or total replacement of the metal parts conventionally used for such a damping device which have a high weight and an insufficient damping of the vibrations at said frequencies.

It is further noted that said at least one of the aforementioned conditions (i), (ii), (iii), preferably at least the conditions (i) and (ii), (ii) and (iii) or (i) and (iii) and even more preferably the three conditions (i), (ii), (iii), can advantageously be satisfied for frequencies of 1 Hz and/or of 3000 Hz and/or for at least one intermediate frequency for example chosen from 100 Hz, 200 Hz, 300 Hz, 400 Hz, 500 Hz, 600 Hz, 700 Hz, 800 Hz, 900 Hz, 1000 Hz, 1100 Hz, 1200 Hz, 1300 Hz, 1400 Hz, 1500 Hz, 1600 Hz, 1700 Hz, 1800 Hz, 1900 Hz, 2000 Hz, 2100 Hz, 2200 Hz, 2300 Hz, 2400 Hz, 2500 Hz, 2600 Hz, 2700 Hz, 2800 Hz and 2900 Hz.

In relation to said first aspect of the invention, said values of tan delta can advantageously further satisfy at least one of the following conditions (ia), (iia), (iiia) (preferably at least the conditions (ia) and (iia), (iia) and (iiia) or (ia) and (iiia) and even more preferably the three conditions (ia), (iia), (iiia)), both for frequencies of 1 Hz and 3000 Hz:
- (ia) tan delta >4.30% at 60° C., preferably >4.40% at 60° C.,
- (iia) tan delta >4.20% at 80° C., preferably >4.30% at 80° C., (iiia) tan delta >3.90% at 90° C., preferably >4.20% at 90° C.

In relation to these conditions (ia), (iia) and/or (iiia) of said first aspect of the invention, said values of tan delta can also more advantageously further satisfy at least one of the following conditions (ib), (iib), (iiib) (preferably at least the conditions (ib) and (iib), (iib) and (iiib) or (ib) and (iiib) and even more preferably the three conditions (ib), (iib), (iiib)), both for frequencies of 1 Hz and 100 Hz:
- (ib) tan delta >4.80% at 60° C., preferably >5.20% at 60° C. and for example >6.00 at 60° C.,
- (iib) tan delta >5.00% at 80° C., preferably >5.50% at 80° C. and for example >7.00 at 80° C.,
- (iiib) tan delta >5.50% at 90° C., preferably >6.00% at 90° C. and for example >7.50 at 90° C.

In relation to said first aspect of the invention, the composition can advantageously have:
- at 23° C. after dry as molded (DAM) conditioning at least one of the following properties measured according to the standard ISO 527:
- a Young's modulus>14.7 GPa and preferably >16.0 GPa,
- a breaking strength>200 MPa and preferably >220 MPa,
- an elongation at break>2.1% and preferably >2.6%; and/or
- at 120° C. after said dry as molded conditioning (DAM) at least one of the following properties measured according to the standard ISO 527:
- a Young's modulus>4.6 GPa and preferably >5.2 GPa,
- a breaking strength>80 MPa and preferably >90 MPa,
- an elongation at break 2.0% and preferably >4.0%.

It is noted that these mechanical properties after dry conditioning of a composition according to the invention are at least equal and most often improved with respect to those of said corresponding control composition.

In relation to said first aspect of the invention, the composition can also advantageously have:
- at 23° C. after said wet conditioning in air at 50% relative humidity (RH50) as defined above at least one of the following properties measured according to the standard ISO 527:
- a Young's modulus≥12.0 GPa and preferably >13.5 GPa,
- a breaking strength>165 MPa and preferably >180 MPa,
- an elongation at break>3.0% and preferably >3.3%; and/or
- at 120° C. after said wet conditioning in air at 50% relative humidity (RH50) at least one of the following properties measured according to the standard ISO 527:
- a Young's modulus≥4.8 GPa and preferably >6.0 GPa,
- a breaking strength≥73 MPa and preferably ≥81 MPa,
- an elongation at break>3.5% and preferably >6.0%.

It is noted that these mechanical properties after wet conditioning of a composition according to the invention are at least equal and most often improved with respect to those of said corresponding control composition.

According to a preferred feature of said first aspect of the invention, the weight ratio of said at least one aliphatic polyamide to said at least one polyphthalamide is inclusively between 1.1 and 5.0, preferably between 1.5 and 4.5 and even more preferably between 2.1 and 4.0.

It is noted that this aliphatic polyamide(s)/PPA(s) weight ratio greater than 1 advantageously allows to make the compositions according to the invention capable of being implemented similarly to said corresponding control composition.

According to another preferred feature of said first aspect of the invention, the composition is free of any compatibilizing agent or processing aid, being for example free of any polyolefin and of any polyether contrary to the composition of the prior art disclosed by JP 4 441 855 B2 which recommends using such a compatibilizing agent.

Even more preferably according to said first aspect of the invention, the composition exclusively consists of said at least one aliphatic polyamide, of said at least one polyphthalamide and of said reinforcing filler.

According to another preferred feature of said first aspect of the invention, the composition comprises, according to the following mass fractions:
- said at least one aliphatic polyamide according to 20% to 55%, preferably 25% to 50%,
- said at least one polyphthalamide according to 5% to 30%, preferably 10% to 27%,
- said glass fibers according to 20% to 55%, preferably 25% to 50%.

According to yet another preferred feature of said first aspect of the invention, said reinforcing filler consists of said glass fibers. In other words, the composition can thus be totally free of any organic or inorganic filler other than glass fibers, and the composition can thus comprise said reinforcing filler according to a mass fraction of 20% to 55%, preferably of 25% to 50%.

It is noted that a fraction of glass fibers greater than 55% in the composition of the invention is not preferable, given that it would be capable of penalizing the damping performance of the composition (i.e. lowering the aforementioned maximum value of tan delta).

According to a second aspect of the invention independent of said first aspect of the invention and of its aforementioned advantageous and preferred features, a thermoplastic polymer composition according to the invention comprises:
- at least one aliphatic polyamide as defined above,
- at least one polyphthalamide as defined above, coming at least partly from an aliphatic diamine having from 6 to 12 atoms of carbon and from an aromatic dicarboxylic acid comprising terephthalic acid, the weight ratio of said at least one aliphatic polyamide to said at least one polyphthalamide being greater than 1, and
- a reinforcing filler as defined above comprising glass fibers.

According to this second aspect of the invention, the composition is free of any compatibilizing agent or processing aid, being for example free of any polyolefin and of any polyether, and it satisfies the following condition (c1):
- (c1): said at least one polyphthalamide is chosen from the group consisting of the PA 6T polyamides, the PA 9T polyamides, the PA 10T polyamides, the PA 6T/X copolyamides, the PA 10T/X copolyamides, and the mixtures of at least two of these polyphthalamides, where X is at least one other polyamide unit coming from an aliphatic diamine having from 6 to 12 atoms of carbon and from an aromatic dicarboxylic acid comprising terephthalic or isophthalic acid, X being for example equal to 66/6I or to 6I in PA 6T/X and coming from an aliphatic diamine having from 6 to 9 atoms of carbon in PA 10T/X.

It is noted that said condition (c1) can also characterize the composition according to said first aspect of the invention defined above, in particular by said conditions (i) to (iii), (ia) to (iiia) and (ib) to (iiib) and/or by the aforementioned mechanical properties.

According to a preferred feature of said second aspect of the invention, the weight ratio of said at least one aliphatic polyamide to said at least one polyphthalamide is inclusively between 1.1 and 5.0, preferably between 1.5 and 4.5 and even more preferably between 2.1 and 4.0.

According to another preferred feature of said second aspect of the invention, the composition comprises according to the following mass fractions:
  said at least one aliphatic polyamide according to 20% to 55%, preferably 25% to 50%,
  said at least one polyphthalamide according to 5% to 30%, preferably 10% to 27%,
  said glass fibers according to 20% to 55%, preferably 25% to 50%.

According to another preferred feature of said second aspect of the invention, said reinforcing filler consists of said glass fibers.

Even more preferably according to said second aspect of the invention, the composition exclusively consists of said at least one aliphatic polyamide, said at least one polyphthalamide and said reinforcing filler.

In relation to said first aspect or said second aspect of the invention defined above, said at least one polyphthalamide:
  is preferably chosen from the PA 10T/X, coming from 1,10-decamethylene diamine and from terephthalic acid and from a unit X coming from an aliphatic diamine having from 6 to 9 atoms of carbon and from terephthalic acid;
  even more preferably consists of a PA 10T/X with X chosen from PA 6T and PA 6-3-T, preferably with a PA 10T:X molar ratio greater than 1, in this case even more preferably consisting
    of a PA 10T/PA 6T, with a PA 10T:PA 6T molar ratio inclusively between 8 and 10 and preferably between 8.5 and 9.5; or
    of a PA 10T/PA 6-3-T, with a PA 10T:PA 6-3-T molar ratio inclusively between 1.1 and 10, in this latter case more preferably consisting
      of a PA 10T/PA 6-3-T having a number-average molecular weight measured by GPC between 10000 and 12000 g/mol, preferably between 10700 and 11700 g/mol, with said PA 10T:PA 6-3-T molar ratio inclusively between 1.2 and 2 and preferably between 1.3 and 1.7; or
      of a PA 10T/PA 6-3-T having a number-average molecular weight measured by GPC between 12000 and 14000 g/mol, preferably between 12500 and 13500 g/mol, with said PA 10T:PA 6-3-T molar ratio inclusively between 8 and 10 and preferably between 8.5 and 9.5.

In relation to said first aspect or said second aspect of the invention defined above, a composition according to the invention can comprise the product of a melt mixing of said at least one aliphatic polyamide, said at least one polyphthalamide and said reinforcing filler, preferably by extrusion.

A method for preparing a composition according to one or the other of said first aspect and said second aspect of the invention is such that melt mixing, in an extruder that is for example twin screw, of said at least one aliphatic polyamide, said at least one polyphthalamide and said reinforcing filler is implemented, preferably without using a compatibilizing agent or processing aid such as a polyolefin or a polyether.

According to another preferred feature of this method according to the invention, a step of premixing said at least one aliphatic polyamide and said at least one polyphthalamide is implemented before introducing into the extruder said reinforcing filler preferably consisting of said glass fibers.

A device with dynamic operation for a motor vehicle according to the invention, capable of damping vibrations in particular in a range of frequencies ranging from 1 to 3000 Hz and at a temperature of 60 to 90° C., is such that the device comprises a composition according to said first aspect or second aspect of the invention defined above, and the device can be free of any metal part and preferably consists of said composition injection molded or of said composition injection molded that is rigidly connected to a metal insert that is for example threaded (the possible metal insert being a minority by weight in the device with respect to the molded composition, the mass fraction of which in the device can thus vary from 80% to 100%, for example).

Advantageously, said device is capable of being provided in a motor vehicle with a heat, hybrid or electric engine, and is chosen from the structural parts transmitting vibrations (e.g. parts adapted to be connected to the wheels of the vehicle so as to receive the vibrations therefrom) and the anti-vibration supports combining first and second rigid elements while damping vibrations between them and while supporting a load, the anti-vibration support preferably being a linking support connecting the engine to an element of the structure of the vehicle, such as a side member of its body.

BRIEF DESCRIPTION OF THE DRAWINGS

Other features, advantages and details of the present invention will appear upon reading the following description of several embodiments of the invention, given for illustrative and non-limiting purposes with the appended drawings, among which.

EMBODIMENTS OF THE INVENTION

Figure 1:
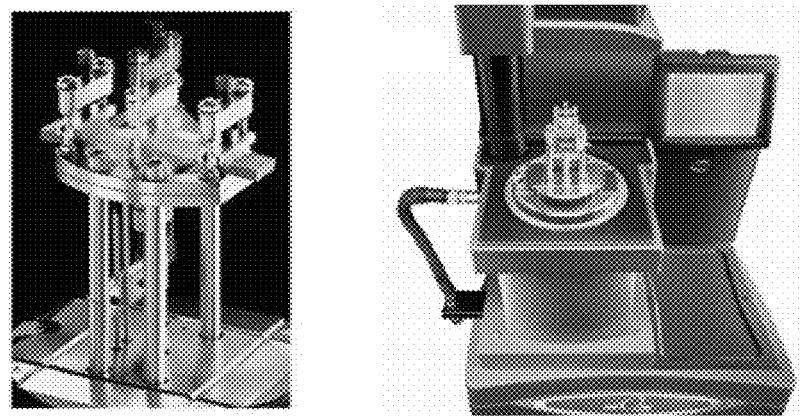
FIG. 1 shows two photographs, the photograph on the left showing a "DMA Q800" apparatus from TA Instruments used for dynamic mechanical analysis (DMA) according to the invention in order to obtain the damping values (tan delta) according to the frequency, and the photograph on the right showing a mounting of the "dual cantilever" type used for this dynamic mechanical analysis (DMA) with this apparatus.

In all the following examples, the compositions C1-C2 and I1-I8 were melt prepared without any compatibilizing agent or processing aid, as follows (mass fractions of the ingredients in each composition in %).

Formulations of the Compositions Tested C1-C4 not According to the Invention and I1-I16 According to the Invention, and Ingredients Used With PA 66 and 50% glass fibers:
C1: PA66 GF50, with 50% of an "Akulon S223D" PA 66 (DSM) and 50% "DS 1128-10N" glass fibers (3B).
I1: 40% of the "Akulon S223D" PA 66 (DSM), 10% of the "Vestamid HT plus M3000" PA 10T/X (Evonik) and 50% of the "DS 1128-10N" glass fibers.
I2: 30% of the "Akulon S223D" PA 66 (DSM), 20% of the "Vestamid HT plus M3000" PA 10T/X (Evonik) and 50% of the "DS 1128-10N" glass fibers.
I3: 40% of the "Akulon S223D" PA 66 (DSM), 10% of the "Vestamid HT plus C2000" PA 10T/X (Evonik) and 50% of the "DS 1128-10N" glass fibers.
I4: 30% of the "Akulon S223D" PA 66 (DSM), 20% of the "Vestamid HT plus C2000" PA 10T/X (Evonik) and 50% of the "DS 1128-10N" glass fibers.
C2: 30% of the "Akulon S223D" PA 66 (DSM), 20% of the "ForTii Ace XTR31" PA 4T (DSM) and 50% of the "DS 1128-10N" glass fibers.
I5: 30% of the "Akulon S223D" PA 66 (DSM), 20% of the "Vestamid HT plus M1000" PA 6T/X (PA 6T/66/6I from Evonik) and 50% of the "DS 1128-10N" glass fibers.
I6: 30% of the "Akulon S223D" PA 66 (DSM), 20% of the "Genestar N1000 A" PA 9T (Kuraray) and 50% of the "DS 1128-10N" glass fibers.
I7: 30% of the "Akulon S223D" PA 66 (DSM), 20% of the "Grivory HT3Z (EMS Grivory)" PA 10T/X and 50% of the "DS 1128-10N" glass fibers.
I8: 30% of the "Akulon S223D" PA 66 (DSM), 20% of the "Badamid 10T" PA 10T (Bada) and 50% of the "DS 1128-10N" glass fibers.

With PA 6 and 50% Glass Fibers:
C3: PA6 GF50, with 50% of an "Akulon F136DH" PA 6 (DSM) and 50% "DS 1128-10N" glass fibers (3B).
I9: 40% of the "Akulon F136DH" PA 6 (DSM), 10% of the "Vestamid HT plus C2000" PA 10T/X (Evonik) and 50% of the "DS 1128-10N" glass fibers.
I10: 30% of the "Akulon F136DH" PA 6 (DSM), 20% of the "Vestamid HT plus C2000" PA 1 OT/X (Evonik) and 50% of the "DS 1128-10N" glass fibers.
I11: 40% of the "Akulon F136DH" PA 6 (DSM), 10% of the "Vestamid HT plus M3000" PA 10T/X (Evonik) and 50% of the "DS 1128-10N" glass fibers.
I12: 30% of the "Akulon F136DH" PA 6 (DSM), 20% of the "Vestamid HT plus M3000" PA 10T/X (Evonik) and 50% of the "DS 1128-10N" glass fibers.

With PA 6 and 35% Glass Fibers:
C4: PA6 GF35, with 65% of an "Akulon F136DH" PA 6 (DSM) and 35% "DS 1128-10N" glass fibers (3B).

I13: 52% of the "Akulon F136DH" PA 6 (DSM), 13% of the "Vestamid HT plus C2000" PA 10T/X (Evonik) and 35% of the "DS 1128-10N" glass fibers.
I14: 50% of the "Akulon F136DH" PA 6 (DSM), 15% of the "Vestamid HT plus C2000" PA 10T/X (Evonik) and 35% of the "DS 1128-10N" glass fibers.
I15: 45% of the "Akulon F136DH" PA 6 (DSM), 20% of the "Vestamid HT plus C2000" PA 10T/X (Evonik) and 35% of the "DS 1128-10N" glass fibers.
I16: 39% of the "Akulon F136DH" PA 6 (DSM), 26% of the "Vestamid HT plus C2000" PA 10T/X (Evonik) and 35% of the "DS 1128-10N" glass fibers.

Chem. 1 shows the semi-developed chemical formula common to the PA 10T/X copolymer "Vestamid HT plus M3000" (grade usually recommended for extrusion) present in each of the compositions I1-I2, and to the PA 10T/X copolymer "Vestamid HT plus C2000" (grade usually recommended for injection) present in each of the compositions I3-I4, a formula obtained by analysis via the 1H NMR technique with X=PA 6-3-T. These two copolymers thus each satisfy the formula PA 10T/PA 6-3-T.

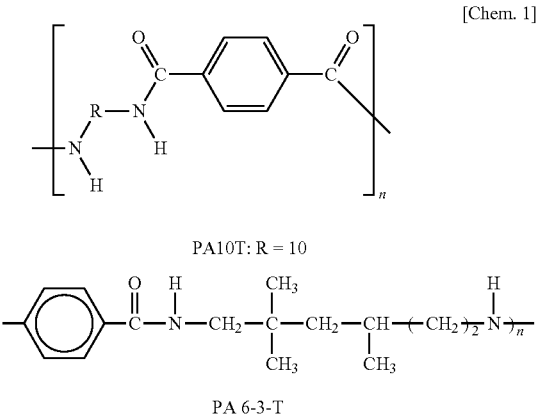

For the "Vestamid HT plus M3000" PA 10T/PA 6-3-T of the compositions I1-I2, the $^1$H NMR analysis gave a PA 10 T block:PA 6-3-T block molar ratio of 90:10 (incertitude of ±5%). The number-average molecular weight Mn of this PA 10T/PA 6-3-T was evaluated at 13000 g/mol by GPC, which gives a number-average degree of polymerization (DPn) of 38.7 for the PA 10T blocks and of 4.5 for the PA 6-3-T blocks.

For the "Vestamid HT plus C2000" PA 10T/PA 6-3-T of the compositions I3-I4, the $^1$H NMR analysis gave a PA 10 T block:PA 6-3-T block molar ratio of 60:40 (incertitude of ±5%). The number-average molecular weight Mn of this PA 10T/PA 6-3-T was evaluated at 11200 g/mol by GPC, which gives a number-average degree of polymerization (DPn) of 22.3 for the PA 10T blocks and of 15.6 for the PA 6-3-T blocks.

Chem. 2 shows the semi-developed chemical formula of the PA 10T/X copolymer "Grivory HT3Z" (grade usually recommended for extrusion) of the composition 17, a formula obtained by analysis via the $^1$H NMR technique with X=PA 6T. This copolymer thus satisfies the formula PA 10T/PA 6T.

[Chem. 2]

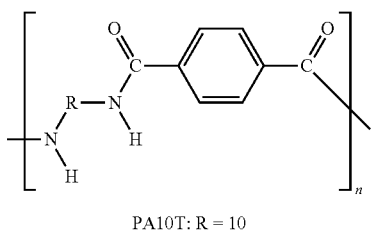

PA10T: R = 10

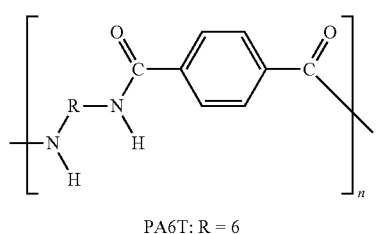

PA6T: R = 6

For this "Grivory HT3Z" PA 10T/PA 6T of the composition I7, the $^1$H NMR analysis gave a PA 10 T block:PA 6T block molar ratio of 90:10 (incertitude of ±5%).

Method for Preparing the Compositions Tested C1-C4 and I1-I16

The physical mixtures of the compositions C1-C4 and I1-I16 were implemented by extrusion in a "Leistritz" twin screw extruder of the ZSE40MAXX (L/D 40) type. Table 1 below indicates the formulations (mass fractions) and extrusion parameters of the compositions C1 and I1-I4.

TABLE 1

| Ingredients | | C1 | I1-I2 | I3-I4 |
|---|---|---|---|---|
| PA 66 | Akulon S223D | 50% | 40-30% | 40-30% |
| PA 10T/X | Vestamid HT plus M3000 | 0 | 10-20% | 0 |

TABLE 1-continued

| | | C1 | I1-I2 | I3-I4 |
|---|---|---|---|---|
| PA 10T/X | Vestamid HT plus C2000 | 0 | 0 | 10-20% |
| Glass fibers | DS 1128-10N | 50% | 50% | 50% |
| Extrusion parameters | | | | |
| Material temperature at output (° C.) | | 302 | 305 | 305 |
| Power (%) | | 51 | 55 | 48 |
| Speed of the screw (rpm) | | 250 | 250 | 250 |
| Total flow rate (kg/h) | | 60 | 60 | 60 |
| Feeding speed (rpm) | | 80 | 80 | 80 |
| Number of holes in the die | | 2 | 2 | 2 |
| Number of blades | | 7 | 7 | 7 |
| Speed of the blades (rpm) | | 4200 | 4200 | 440 |
| Output pressure ($10^5$ Pa) | | 84 | 83 | 79 |

Table 2 below indicates the formulations (mass fractions) and extrusion parameters of the compositions C1-C2 and I5-I8.

TABLE 2

| | | C1 | C2 | I5 | I6 | I7 | I8 |
|---|---|---|---|---|---|---|---|
| Ingredients | | | | | | | |
| PA 66 | Akulon S223D | 50% | 30% | 30% | 30% | 30% | 30% |
| PA 4T | ForTii Ace XTR31 | 0 | 20% | 0 | 0 | 0 | 0 |
| PA6T/X | Vestamid HT plus M1000 | 0 | 0 | 20% | 0 | 0 | 0 |
| PA9T | Genestar N1000A | 0 | 0 | 0 | 20% | 0 | 0 |
| PA10T/X | Grivory HT3Z | 0 | 0 | 0 | 0 | 20% | 0 |
| PA10T | Badamid 10T | 0 | 0 | 0 | 0 | 0 | 20% |
| Glass fibers | DS 1128-10N | 50% | 50% | 50% | 50% | 50% | 50% |
| Implementation parameters | | | | | | | |
| Material temperature at output in (° C.) | | 302 | 304 | 303 | 307 | 303 | 306 |
| Power (%) | | 51 | 44 | 56 | 51 | 51 | 46 |
| Speed of the screw (rpm) | | 250 | 250 | 250 | 250 | 250 | 250 |
| Total flow rate (kg/h) | | 60 | 60 | 60 | 60 | 60 | 60 |
| Feeding speed (rpm) | | 80 | 80 | 80 | 80 | 80 | 80 |
| Number of holes in the die | | 2 | 2 | 2 | 2 | 2 | 2 |
| Number of blades | | 7 | 7 | 7 | 7 | 7 | 7 |
| Speed of the blades (rpm) | | 4200 | 5000 | 4200 | 4500 | 5000 | 4500 |
| Output pressure ($10^5$ Pa) | | 84 | 51 | 81 | 57 | 45 | 46 |

Table 3 below indicates the formulations (mass fractions) and extrusion parameters of the compositions C3 and I9-I12.

TABLE 3

| | | C3 | I9 | I10 | I11 | I12 |
|---|---|---|---|---|---|---|
| Ingredients | | | | | | |
| PA 6 | Akulon F136 DH | 50% | 40% | 30% | 40% | 30% |
| PA10T/X | Vestamid HT plus C2000 | 0 | 10 | 20% | 0 | 0 |
| PA10T/X | Vestamid HT plus M3000 | 0 | 0 | 0 | 10% | 20% |
| Glass fibers | DS 1128-10N | 50% | 50% | 50% | 50% | 50% |
| Implementation parameters | | | | | | |
| Material temperature at output in (° C.) | | 252 | 257 | 259 | 256 | 259 |

TABLE 3-continued

|  | C3 | I9 | I10 | I11 | I12 |
|---|---|---|---|---|---|
| Power (%) | 73 | 77 | 70 | 75 | 68 |
| Speed of the screw (rpm) | 280 | 1250 | 250 | 250 | 250 |
| Total flow rate (kg/h) | 60 | 60 | 60 | 60 | 60 |
| Feeding speed (rpm) | 80 | 80 | 80 | 80 | 80 |
| Number of holes in the die | 2 | 2 | 2 | 2 | 2 |
| Number of blades | 7 | 7 | 7 | 7 | 7 |
| Speed of the blades (rpm) | 3600 | 4000 | 4000 | 4000 | 3600 |
| Output pressure ($10^5$ Pa) | 92 | 110 | 115 | 106 | 97 |

Table 4 below indicates the formulations (mass fractions) and extrusion parameters of the compositions C4 and I13-I16.

TABLE 4

|  |  | C4 | I13 | I14 | I15 | I16 |
|---|---|---|---|---|---|---|
| Ingredients |  |  |  |  |  |  |
| PA 6 | Akulon F136 DH | 65% | 52% | 50% | 145% | 39% |
| PA10T/X | Vestamid HT plus C2000 | 0 | 13% | 15% | 20% | 26% |
| Glass fibers | DS 1128-10N | 35% | 35% | 35% | 35% | 35% |
| Implementation parameters |  |  |  |  |  |  |
| Material temperature at exit (° C.) |  | 253 | 256 | 257 | 257 | 253 |
| Power (%) |  | 74 | 68 | 61 | 52 | 60 |
| Speed of the screw (rpm) |  | 280 | 280 | 280 | 280 | 280 |
| Total flow rate (kg/h) |  | 60 | 160 | 50 | 50 | 60 |
| Feeding speed (rpm) |  | 80 | 80 | 80 | 80 | 80 |
| Number of holes in the die |  | 2 | 12 | 12 | 12 | 12 |
| Number of blades |  | 7 | 7 | 7 | 7 | 7 |
| Speed of the blades (rpm) |  | 3600 | 3600 | 4000 | 4000 | 3600 |
| Output pressure ($10^5$ Pa) |  | 90 | 89 | 86 | 62 | 71 |

Pellets of PA66 or of PA6 according to the compositions and of the PPA (i.e. of the PA10T/X for I1-I4, I7, I9-I16, of the PA 4T for C2, of the PA 6T/X for I5, of the PA 9T for I6 and of the PA 10T for I8) were premixed, then they were introduced into the extruder using a dosing unit, and the glass fibers were then introduced into the extruder at the zone Z6 of the latter using a side feeder. As visible in tables 1 to 4, it can be noted that the incorporation of the PPA into the compositions I1-I16 did not lead to a major modification of the parameters of implementation of the compositions I1-I16.

The glass transition temperatures Tg of the compositions obtained by the aforementioned "dual cantilever" "DMA" technique were measured via said rectangular test pieces having the dimensions 34.81*4*2 mm by temperature sweeps at 2.5 μm of deformation, at a frequency f of 1 Hz and with a ramp of 3° C./minute. Table 5 below shows as examples the values thus obtained for the compositions C1, C2 and I1-I8.

TABLE 5

|  | Compositions |  |  |  |  |  |  |  |  |  |
|---|---|---|---|---|---|---|---|---|---|---|
|  | C1 | C2 | I1 | I2 | I3 | I4 | I5 | I6 | I7 | I8 |
| Tg (° C.) | 32 | 61 | 73 | 86 | 67 | 80 | 83 | 60 | 77 | 75 |

Static Mechanical Properties of the Compositions C1-C4 and I1-I16

Tables 6 and 7 below each describe in detail the static properties obtained for injection molded test pieces of the H2 type consisting of the compositions C1-C2 and I1-I8, measured at two temperatures of 23 and 120° C. either in the aforementioned initial "DAM" state (i.e. after drying of the H2 test pieces for 4 hours at 80° C.) or after said later RH50 wet conditioning as defined above. The standard ISO 527 was followed to measure these properties.

TABLE 6

| Test conditions | Properties | C1 | I1 | I2 | I3 | I4 |
|---|---|---|---|---|---|---|
| 23° C. DAM | Young's modulus (GPa) | 14.7 | 14.9 | 15.6 | 16.5 | 14.9 |
|  | standard deviation | 0.7 | 0.6 | 0.6 | 0.1 | 0.3 |
|  | Breaking strength (MPa) | 194 | 209 | 221 | 206 | 209 |
|  | standard deviation | 4 | 5 | 4 | 6 | 4 |
|  | Elongation at break (%) | 2.4 | 2.3 | 2.7 | 2.2 | 2.4 |
|  | standard deviation | 0.1 | 0.1 | 0.2 | 0.2 | 0.1 |
| 120° C. DAM | Young's modulus (GPa) | 6.0 | 6.2 | 5.3 | 6.7 | 4.7 |
|  | standard deviation | 0.4 | 0.3 | 0.2 | 0.6 | 0.2 |
|  | Breaking strength (MPa) | 100 | 100 | 90 | 103 | 85 |
|  | standard deviation | 3 | 3 | 3 | 3 | 1 |
|  | Elongation at break (%) | 4.4 | 6.2 | 7.9 | 5.7 | 2.0 |
|  | standard deviation | 0.6 | 0.4 | 0.9 | 0.6 | 0.2 |
| 23° C. RH50 | Moisture content (%) | 1.20 | 1.17 | 0.91 | 1.10 | 0.94 |
|  | Young's modulus (GPa) | 11.2 | 12.2 | 14.3 | 12.0 | 14.2 |
|  | standard deviation | 0.6 | 0.7 | 0.6 | 0.5 | 0.7 |
|  | Breaking strength (MPa) | 148 | 167 | 187 | 175 | 189 |
|  | standard deviation | 6 | 6 | 9 | 3 | 5 |
|  | Elongation at break (%) | 2.8 | 3.4 | 3.5 | 3.4 | 3.2 |
|  | standard deviation | 0.4 | 0.2 | 0.3 | 0.1 | 0.3 |
| 120° C. RH50 | Moisture content (%) | 1.20 | 1.17 | 0.91 | 1.10 | 0.94 |
|  | Young's modulus (GPa) | 5.6 | 6.3 | 5.6 | 6.1 | 5.3 |
|  | standard deviation | 0.4 | 0.3 | 0.4 | 0.1 | 0.5 |
|  | Breaking strength (MPa) | 87 | 90 | 81 | 89 | 81 |
|  | standard deviation | 4 | 3 | 2 | 3 | 1 |
|  | Elongation at break (%) | 4.5 | 6.3 | 8.4 | 6.3 | 8.4 |
|  | standard deviation | 0.8 | 5.2 | 0.1 | 0.7 | 1.2 |

At 23° C., table 6 globally shows an improvement of the mechanical properties of the compositions I1-I4 of the invention with respect to the composition C1 via the addition of a PA10T/X to the PA 66, this improvement being particularly clear after said RH50 conditioning where it was observed that the compositions I1-I4 were much less sensitive to the humidity absorption than the composition C1.

At 120° C., table 6 shows that this improvement of the mechanical properties related more particularly to the compositions I1 and I3 with a mass fraction of PA10T/X of 10%, in comparison to the compositions I2 and I4 characterized by a mass fraction of PA10T/X of 20%.

TABLE 7

| Test conditions | Properties | C1 | C2 | I5 | I6 | I7 | I8 |
|---|---|---|---|---|---|---|---|
| 23° C. DAM | (Young's modulus (GPa) | 14.7 | 16.9 | 17.4 | 16.0 | 15.2 | 14.8 |
| | standard deviation | 0.7 | 0.8 | 0.4 | 1.6 | 1.0 | 0.4 |
| | Breaking strength (MPa) | 194 | 163 | 230 | 228 | 201 | 223 |
| | standard deviation | 4 | 4 | 1 | 5 | 7 | 4 |
| | Elongation at break (%) | 2.4 | 1.6 | 2.5 | 2.9 | 2.9 | 2.8 |
| | standard deviation | 0.1 | 0.1 | 0.1 | 0.1 | 0.2 | 0.1 |
| 120° C. DAM | Young's modulus (GPa) | 6.0 | 6.5 | 5.7 | 6.2 | 5.4 | 5.6 |
| | standard deviation | 0.4 | 0.7 | 0.1 | 0.8 | 0.4 | 0.2 |
| | Breaking strength (MPa) | 100 | 81 | 100 | 103 | 91 | 100 |
| | standard deviation | 3 | 1 | 1 | 5 | 3 | 1 |
| | Elongation at break (%) | 4.4 | 4.2 | 7.0 | 8.7 | 9.2 | 8.3 |
| | standard deviation | 0.6 | 0.3 | 0.4 | 0.9 | 0.7 | 0.2 |
| 23° C. RH50 | Moisture content (%) | 1.20 | 0.83 | 0.91 | 0.68 | 0.66 | 0.63 |
| | Young's modulus (GPa) | 11.2 | 13.8 | 14.2 | 15.0 | 14.0 | 14.3 |
| | standard deviation | 0.6 | 0.3 | 0.4 | 0.5 | 0.8 | 0.9 |
| | Breaking strength (MPa) | 148 | 138 | 201 | 207 | 184 | 198 |
| | standard deviation | 6 | 1 | 4 | 3 | 5 | 6 |
| | Elongation at break (%) | 2.8 | 1.9 | 3.2 | 3.3 | 3.1 | 3.3 |
| | standard deviation | 0.4 | 0.1 | 0.3 | 0.1 | 0.1 | 0.1 |
| 120° C. RH50 | Moisture content (%) | 1.20 | 0.83 | 0.91 | 0.68 | 0.66 | 0.63 |
| | Young's modulus (GPa) | 5.6 | 6.4 | 5.6 | 6.3 | 5.3 | 4.8 |
| | standard deviation | 0.4 | 0.3 | 0.2 | 0.6 | 0.2 | 0.1 |
| | Breaking strength (MPa) | 87 | 73 | 90 | 97 | 81 | 84 |
| | standard deviation | 4 | 4 | 2 | 2 | 2 | 1 |
| | Elongation at break (%) | 4.5 | 3.6 | 8.5 | 5.7 | 7.8 | 8.5 |
| | standard deviation | 0.8 | 0.2 | 0.5 | 0.9 | 1.0 | 0.3 |

At both 23° C. and 120° C., table 7 globally shows an improvement of the mechanical properties of the compositions I5-I8 of the invention with respect to the compositions C1 and C2 via the addition to the PA 66 of a PPA according to the invention, this improvement being particularly clear after said RH50 conditioning where it was observed that the compositions I5-I8 were much less sensitive to the humidity absorption than the compositions C1 and C2.

Table 8 below describes in detail the static properties obtained for injection molded test pieces of the H2 type consisting of the compositions C3 and I9-I12, measured at two temperatures of 23 and 120° C. either in the aforementioned initial "DAM" state (i.e. after drying of the H2 test pieces for 4 hours at 80° C.) or after said later RH50 wet conditioning as defined above. The standard ISO 527 was followed to measure these properties.

TABLE 8

| Test conditions | Properties | C3 | I9 | I10 | I11 | I12 |
|---|---|---|---|---|---|---|
| 23° C. DAM | Young's modulus (GPa) | 13.6 | 14.7 | 13.9 | 15.5 | 15.9 |
| | standard deviation | 0.3 | 0.2 | 0.4 | 0.5 | 1.0 |
| | Breaking strength (MPa) | 172 | 195 | 208 | 202 | 203 |
| | standard deviation | 4 | 5 | 2 | 2 | 3 |
| | Elongation at break (%) | 3.4 | 2.4 | 2.6 | 2.3 | 2.7 |
| | standard deviation | 0.4 | 0.1 | 0.2 | 0.1 | 0.2 |
| 120° C. DAM | Young's modulus (GPa) | 4.6 | 4.3 | 3.4 | 4.7 | 4.6 |
| | standard deviation | 0.3 | 0.2 | 0.1 | 0.7 | 0.6 |
| | Breaking strength (MPa) | 82 | 70 | 64 | 84 | 84 |
| | standard deviation | 2 | 3 | 4 | 4 | 3 |
| | Elongation at break (%) | 10.0 | 10.4 | 14.8 | 8.4 | 8.2 |
| | standard deviation | 0.5 | 0.4 | 2.8 | 0.2 | 0.8 |

TABLE 8-continued

| Test conditions | Properties | C3 | I9 | I10 | I11 | I12 |
| --- | --- | --- | --- | --- | --- | --- |
| 23° C. RH50 | Moisture content (%) | 1.43 | 1.28 | 1.09 | 1.31 | 1.04 |
| | Young's modulus (GPa) | 7.8 | 10.3 | 13.4 | 10.1 | 11.8 |
| | standard deviation | 0.2 | 0.5 | 0.2 | 0.4 | 0.6 |
| | Breaking strength (MPa) | 124 | 143 | 170 | 147 | 166 |
| | standard deviation | 3 | 2 | 7 | 2 | 2 |
| | Elongation at break (%) | 7.0 | 5.3 | 3.5 | 4.1 | 3.1 |
| | standard deviation | 0.4 | 0.2 | 0.3 | 0.4 | 0.1 |
| 120° C. RH50 | Moisture content (%) | 1.43 | 1.28 | 1.09 | 1.31 | 1.04 |
| | Young's modulus (GPa) | 4.1 | 3.6 | 3.0 | 4.6 | 3.6 |
| | standard deviation | 0.5 | 0.1 | 0.4 | 0.4 | 0.5 |
| | Breaking strength (MPa) | 77 | 62 | 62 | 71 | 68 |
| | standard deviation | 2 | 1 | 1 | 2 | 1 |
| | Elongation at break (%) | 8.4 | 10.6 | 12.4 | 8.6 | 9.7 |
| | standard deviation | 0.5 | 0.9 | 0.3 | 0.6 | 1.3 |

Table 8 globally shows an improvement or at least a conservation of the mechanical properties of the compositions I9-I12 of the invention with respect to the composition C3 via the addition of a PA10T/X to the PA 6.

Table 9 below describes in detail the static properties obtained for injection molded test pieces of the H2 type consisting of the compositions C4 and I13-I16, measured at two temperatures of 23 and 120° C. either in the aforementioned initial "DAM" state (i.e. after drying of the H2 test pieces for 4 hours at 80° C.) or after said later RH50 wet conditioning as defined above. The standard ISO 527 was followed to measure these properties.

TABLE 9

| Test conditions | Properties | C4 | I13 | I14 | I15 | I16 |
| --- | --- | --- | --- | --- | --- | --- |
| 23° C. DAM | Young's modulus (GPa) | 10.5 | 10.8 | 10.5 | 12.0 | 10.2 |
| | standard deviation | 0.1 | 1.0 | 1.5 | 3.0 | 1.3 |
| | Breaking strength (MPa) | 164 | 177 | 185 | 168 | 182 |
| | standard deviation | 2 | 3 | 3 | 6 | 6 |
| | Elongation at break (%) | 4.1 | 3.9 | 4.2 | 2.9 | 3.5 |
| | standard deviation | 0.1 | 0.3 | 0.2 | 0.1 | 0.2 |
| 120° C. DAM | Young's modulus (GPa) | 2.8 | 3.1 | 3.6 | 2.0 | 2.7 |
| | standard deviation | 0.2 | 0.4 | 0.4 | 0.7 | 0.4 |
| | Breaking strength (MPa) | 74 | 72 | 76 | 62 | 59 |
| | standard deviation | 3 | 3 | 1 | 4 | 3 |
| | Elongation at break (%) | 15.8 | 19.1 | 19.9 | 16.1 | 20.4 |
| | standard deviation | 1.1 | 0.7 | 0.9 | 0.2 | 3.4 |
| 23° C. RH50 | Moisture content (%) | 2.06 | 1.71 | 1.90 | 1.14 | 1.13 |
| | Young's modulus (GPa) | 5.1 | 6.2 | 6.3 | 6.3 | 11.1 |
| | standard deviation | 0.2 | 0.3 | 0.2 | 0.4 | 1.2 |
| | Breaking strength (MPa) | 100 | 122 | 121 | 114 | 163 |
| | standard deviation | 2 | 2 | 4 | 2 | 3 |
| | Elongation at break (%) | 12.3 | 8.0 | 9.3 | 7.2 | 3.9 |
| | standard deviation | 0.7 | 1.0 | 1.0 | 0.5 | 0.2 |
| 120° C. RH50 | Moisture content (%) | 2.06 | 1.71 | 1.90 | 1.14 | 1.13 |
| | Young's modulus (GPa) | 2.7 | 2.8 | 2.6 | 2.3 | 2.3 |
| | standard deviation | 0.3 | 0.3 | 0.3 | 0.2 | 0.6 |
| | Breaking strength (MPa) | 70 | 68 | 65 | 53 | 55 |
| | standard deviation | 4 | 3 | 2 | 1 | 2 |
| | Elongation at break (%) | 13.9 | 17.4 | 18.0 | 16.9 | 20.6 |
| | standard deviation | 1.4 | 0.4 | 1.4 | 1.7 | 1.1 |

Table 9 globally shows an improvement or at least a conservation of the mechanical properties of the compositions I13-I16 of the invention with respect to the composition C4 via the addition of a PA10T/X to the PA 6.

Dynamic Mechanical Properties of the Compositions C1-C4 and I1-I16

Tables 10-13 below each describe in detail the dynamic properties obtained for rectangular test pieces having a length L of 34.81 mm, a width I of 4 mm and a thickness e of 2 mm, the damping performance of the compositions C1-C4 and I1-I16 being measured as follows.

The values of tan delta were measured on the "DMA Q800" apparatus via the dual cantilever mounting (see FIG. 1) according to the standard ISO 6721-5, by carrying out frequency sweeps ranging from 0.1 to 20 Hz at various temperatures (from −60° C. to +60° C. by plateaus of 5° C. with respect to the glass transition temperature Tg of each composition C1-C4, I1-I16), and by applying to the test pieces a movement of 2.5 μm (amplitude of deformation imposed).

The "TTS" principle of time-temperature superposition was then used to construct index contours of tan delta covering a broad range of frequencies including the range of frequencies of interest from 1 to 3000 Hz at the desired temperatures, wherein these index contours can be "translated" along the horizontal axis of the frequencies by using the Williams-Landel-Ferry empirical relationship ("WLF" translation law, see FIGS. 2 to 4) to represent the damping thus obtained for each composition C1-C4, I1-I16 at the desired temperature. The "TTS" principle allows to analyze the values of tan delta of the compositions at various temperatures, the preferred range for which these compositions were developed extending from 60 to 90° C., and the frequency range from 1 to 3000 Hz.

Figure 2:
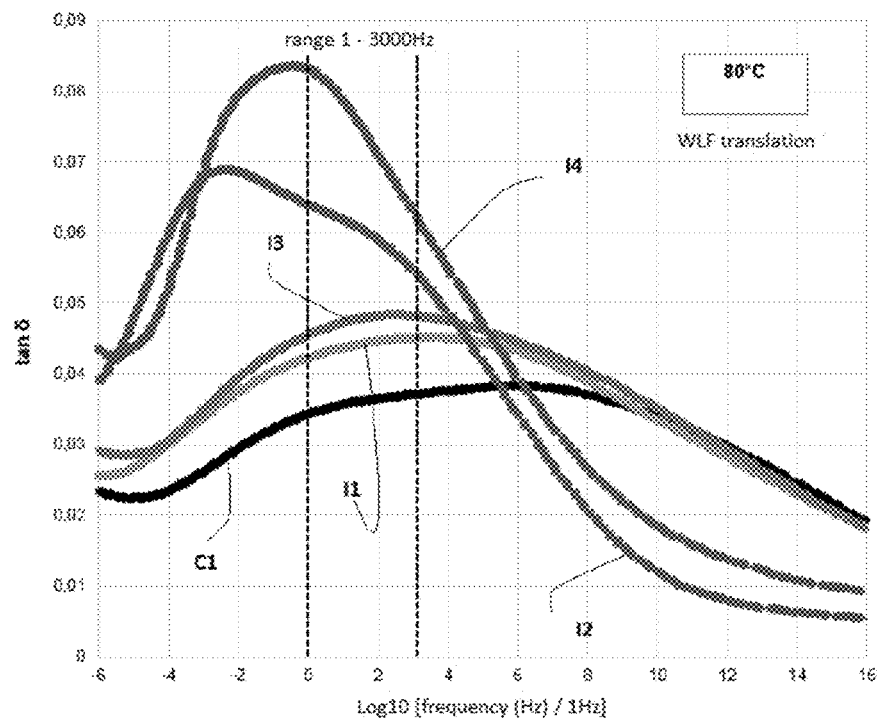
FIG. 2 is a graph showing the damping properties (tan delta) obtained at 80° C. according to the frequency (Hz) with the apparatus and the mounting of FIG. 1, for a control composition C1 of the PA66 GF50 type and four compositions according to the invention I1, I2, I3, I4 comprising a PA 10T/X copolymer in addition to the PA 66, all conditioned under a wet atmosphere according to said RH50 conditioning as defined above.

FIG. 2 shows the damping compared according to the frequency of the compositions C1 and I1-I4 at 80° C. after said conditioning in RH50 humidity, in relation to the values of tan delta listed in table 10 at the four temperatures of 60° C., 70° C., 80° C. and 90° C.

FIG. 2 further shows an offset of the maximum of tan delta towards the low frequencies (less than or equal to 1 Hz, for example between $10^{-2}$ Hz and 1 Hz) with an increase in the quantity of PA 10T/X present in the composition, as shown by the peaks of tan delta for the compositions I2, I4.

Figure 3:
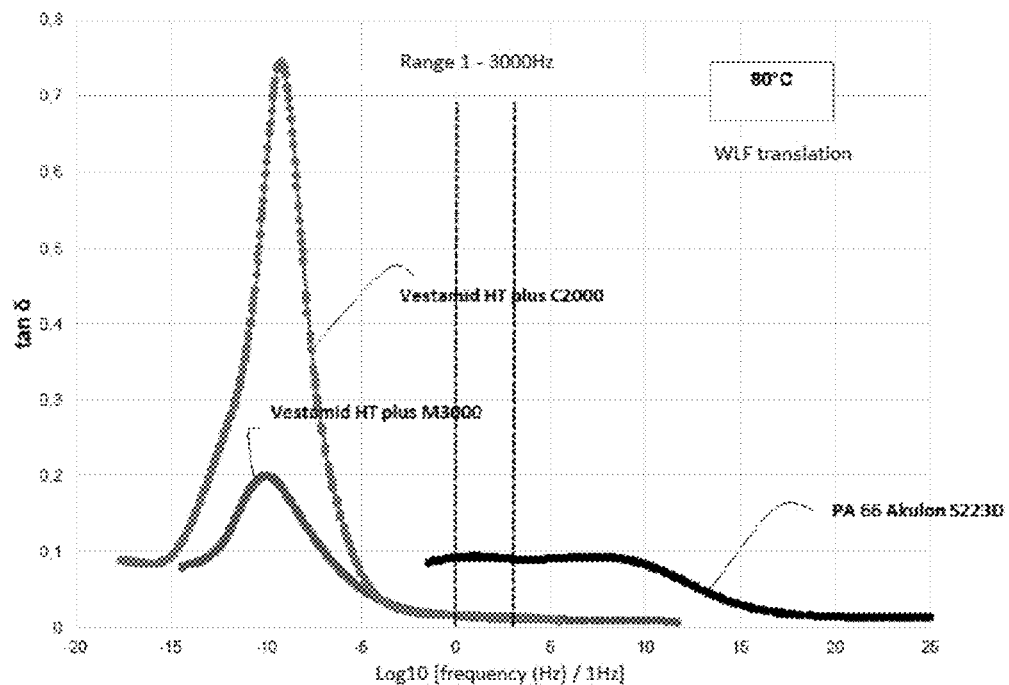
FIG. 3 is a graph showing the damping properties (tan delta) obtained at 80° C. according to the frequency (Hz) with the apparatus and the mounting of FIG. 1, for the PA 66 and two PA 10T/X of the compositions I1-I2 and I3-I4, all conditioned under a wet atmosphere according to said RH50 conditioning as defined above.

FIG. 3 compares the damping properties at 80° C. after said RH50 conditioning of the two respective PPAs of the compositions I1-I2 and I3-I4 to those of the "Akulon

TABLE 10

| Temperature | | tan delta (%) | | | | |
|---|---|---|---|---|---|---|
| (° C.) | Compositions | 1 Hz | 100 Hz | 500 Hz | 1000 Hz | 3000 Hz |
| 60 | C1 | 3.71 | 3.81 | 3.83 | 3.83 | 3.82 |
|    | I1 | 4.50 | 4.43 | 4.36 | 4.30 | 4.22 |
|    | I2 | 5.47 | 4.17 | 3.68 | 3.41 | 3.16 |
|    | I3 | 4.82 | 4.63 | 4.52 | 4.45 | 4.37 |
|    | I4 | 6.53 | 4.91 | 4.40 | 4.15 | 3.79 |
| 70 | C1 | 3.61 | 3.73 | 3.76 | 3.79 | 3.80 |
|    | I1 | 4.41 | 4.51 | 4.49 | 4.45 | 4.44 |
|    | I2 | 6.08 | 5.28 | 4.80 | 4.65 | 4.28 |
|    | I3 | 4.77 | 4.80 | 4.74 | 4.69 | 4.64 |
|    | I4 | 7.70 | 6.07 | 5.54 | 5.30 | 4.91 |
| 80 | C1 | 3.42 | 3.64 | 3.68 | 3.70 | 3.72 |
|    | I1 | 4.23 | 4.45 | 4.50 | 4.50 | 4.51 |
|    | I2 | 6.38 | 5.90 | 5.60 | 5.47 | 5.23 |
|    | I3 | 4.55 | 4.82 | 4.83 | 4.82 | 4.79 |
|    | I4 | 8.31 | 7.13 | 6.53 | 6.32 | 5.93 |
| 90 | C1 | 3.13 | 3.51 | 3.59 | 3.61 | 3.65 |
|    | I1 | 3.93 | 4.33 | 4.40 | 4.43 | 4.45 |
|    | I2 | 6.67 | 6.21 | 6.03 | 5.96 | 5.77 |
|    | I3 | 4.21 | 4.68 | 4.78 | 4.80 | 4.83 |
|    | I4 | 8.27 | 7.96 | 7.44 | 7.19 | 6.82 |

Table 10, illustrated by FIG. 2, shows that the compositions I1-I4 had a damping clearly greater than that of the composition C1 in the aforementioned ranges of temperatures and of frequencies of interest. It is noted that this damping was even more clearly improved for the compositions I3 and I4 comprising a PA 10T/X with a molar ratio of the PA 10T blocks:X of 60:40 (±5%) and an Mn between 10000 and 12000 g/mol.

This table 10 also shows that the damping increases with the quantity of PA 10T/X present in the composition, as shown by the values of tan delta for the compositions I2 and I4 (with 20% by weight of PA 10T/X) in comparison to I1 and I3 (with 10% by weight of PA 10T/X). It is noted that the composition I4 thus represents a particularly advantageous embodiment of the invention given its very high values of tan delta:

at 60° C., in particular greater than 6.50% at 1 Hz, than 4.90% at 100 Hz and of 4.40% at 500 Hz,
at 70° C., in particular greater than 7.50% at 1 Hz, than 6.00% at 100 Hz and than 5.50% at 500 Hz,
at 80° C., in particular greater than 8.30% at 1 Hz, than 7.10% at 100 Hz and than 6.50% at 500 Hz, and
at 90° C., in particular greater than 8.20% at 1 Hz, than 7.90% at 100 Hz, than 7.40% at 500 Hz and surprisingly greater than 7.10% at 1000 Hz and than 6.80% at 3000 Hz (values often more than double in comparison to those of the composition C1).

S223D" non-fibered PA66 also used. FIG. 3 shows that the maximum damping (peak of tan delta), if it is greater for each of these two PPAs than for this PA 66, is located at very low frequencies (approximately $10^{-10}$ Hz for the PPAs of the compositions I1-I2, and $10^{-9}$ Hz for the PPAs of the compositions I3-I4). As a result, a mass fraction in the composition of PPA greater than or equal to that of the PA 66 would be capable of causing:

an undesirable offset of the peak of tan delta of the compositions towards frequencies that are too low, and would thus reduce the damping of the compositions in the frequency range of interest from 1 to 3000 Hz targeted in the invention, and a significant change in the parameters of implementation of the compositions, whereas a goal of the invention is for them to be capable of being implemented in the closest manner possible to the "PA66 GF50" composition C1.

Consequently, the use in the compositions of the invention of a PA 66 to PPA weight ratio greater than 1 allows to overcome these disadvantages.

Table 11 below shows the damping compared according to the frequency of the compositions C1-C2 and I5-I8 at the aforementioned four temperatures of 60° C., 70° C., 80° C. and 90° C., after said conditioning in RH50 humidity as defined above.

TABLE 11

| Temperature (° C.) | Compositions | tan delta (%) | | | | |
|---|---|---|---|---|---|---|
| | | 1 Hz | 100 Hz | 500 Hz | 1000 Hz | 3000 Hz |
| 60 | C1 | 3.71 | 3.81 | 3.83 | 3.83 | 3.82 |
| | C2 | 4.37 | 4.19 | 4.10 | 4.04 | 3.96 |
| | I5 | 5.17 | 4.46 | 4.19 | 4.06 | 3.82 |
| | I6 | 5.37 | 4.77 | 4.41 | 4.26 | 3.95 |
| | I7 | 5.00 | 4.19 | 3.90 | 3.74 | 3.53 |
| | I8 | 5.10 | 4.11 | 3.74 | 3.55 | 3.32 |
| 70 | C1 | 3.61 | 3.73 | 3.76 | 3.79 | 3.80 |
| | C2 | 4.42 | 4.36 | 4.31 | 4.28 | 4.23 |
| | I5 | 5.67 | 5.00 | 4.76 | 4.65 | 4.49 |
| | I6 | 5.49 | 5.34 | 5.18 | 5.08 | 4.90 |
| | I7 | 5.46 | 4.92 | 4.69 | 4.54 | 4.34 |
| | I8 | 5.63 | 5.00 | 4.71 | 4.54 | 4.27 |
| 80 | C1 | 3.42 | 3.64 | 3.68 | 3.70 | 3.72 |
| | C2 | 4.38 | 4.41 | 4.40 | 4.38 | 4.36 |
| | I5 | 5.89 | 5.49 | 5.25 | 5.14 | 4.97 |
| | I6 | 5.39 | 5.49 | 5.45 | 5.42 | 5.35 |
| | I7 | 5.65 | 5.39 | 5.22 | 5.11 | 4.97 |
| | I8 | 5.88 | 5.54 | 5.34 | 5.22 | 5.05 |
| 90 | C1 | 3.13 | 3.51 | 3.59 | 3.61 | 3.65 |
| | C2 | 4.20 | 4.41 | 4.42 | 4.42 | 4.41 |
| | I5 | 5.82 | 5.79 | 5.63 | 5.55 | 5.38 |
| | I6 | 5.11 | 5.45 | 5.48 | 5.49 | 5.48 |
| | I7 | 5.72 | 5.60 | 5.51 | 5.46 | 5.36 |
| | I8 | 5.97 | 5.81 | 5.69 | 5.63 | 5.52 |

Figure 4:
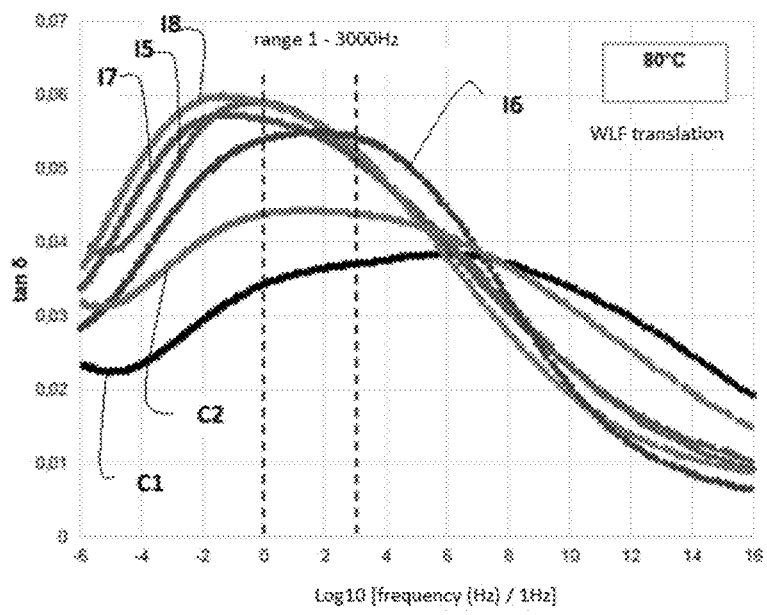
FIG. 4 is a graph showing the damping properties (tan delta) obtained at 80° C. according to the frequency (Hz) with the apparatus and the mounting of FIG. 1, for the control composition C1, a composition C2 not according to the invention comprising a PA 66+PA 4T alloy and four other compositions according to the invention I5, I6, I7, I8, comprising in addition to the PA 66 respectively a PA 6T/X, a PA 9T, another PA 10T/X and a PA 10T, all conditioned under a wet atmosphere according to said RH50 conditioning as defined above.

Table 11 combined with FIG. 4, which illustrates it at the temperature of 80° C., shows that the compositions I5-I8 had a damping clearly greater than that of the compositions C1-C2 in the ranges of temperatures and of frequencies of interest, i.e. between 1 and 3000 Hz, even if this damping was sometimes less than that measured for the compositions I1-I4 comprising a PA 10T/X as the PPA. It can be noted that the presence in the composition C2 of a PA 4T as the PPA mixed with the PA 66 does not allow sufficient damping at 60-90° C. at the frequencies of interest of 1-3000 Hz to be obtained, as shown by the values of tan delta of the composition C2 often lower than those obtained for the compositions I1-I4 (despite a mass fraction of PA 4T in the composition C2 of 20%).

In particular, the composition I7 which comprises, as the PPA, 10% by weight of a PA 10T/X other than those of the compositions I1-I4 (i.e. a PA 10T/PA 6T characterized by a PA 10T:PA 6T molar ratio between 8 and 10), has a damping improved with respect to that obtained for the compositions I1 and I3 (also comprising 10% by weight of a PA 10T/X of the PA 10T/6-3-T type).

Moreover, the compositions I5, I6 and I8 according to the invention, comprising 20% by weight of a PA 6T/X, of a PA 9T and of a PA 10T, respectively, each have a damping substantially greater than or equal to those obtained for the compositions I1 and I3 both comprising 10% by weight of PA 10T/X.

Table 12 below shows the damping compared according to the frequency of the compositions C3 and I9-I12 at the aforementioned four temperatures of 60° C., 70° C., 80° C. and 90° C., after said conditioning in RH50 humidity as defined above.

TABLE 12

| Temperature (° C.) | Compositions | tan delta (%) | | | | |
|---|---|---|---|---|---|---|
| | | 1 Hz | 100 Hz | 500 Hz | 1000 Hz | 3000 Hz |
| 60 | C3 | 4.15 | 4.49 | 4.64 | 4.69 | 4.81 |
| | I9 | 7.23 | 7.34 | 7.15 | 7.00 | 6.80 |
| | I10 | 10.49 | 8.81 | 7.19 | 6.31 | 5.25 |
| | I11 | 4.97 | 4.87 | 4.83 | 4.81 | 4.75 |
| | I12 | 6.10 | 5.59 | 5.31 | 5.17 | 4.91 |
| 70 | C3 | 3.96 | 4.24 | 4.35 | 4.41 | 4.49 |
| | I9 | 6.79 | 7.36 | 7.41 | 7.39 | 7.32 |
| | I10 | 10.27 | 10.27 | 9.53 | 9.12 | 8.01 |
| | I11 | 5.02 | 4.95 | 4.91 | 4.90 | 4.88 |
| | I12 | 6.32 | 6.04 | 5.89 | 5.80 | 5.68 |
| 80 | C3 | 3.67 | 4.06 | 4.15 | 4.19 | 4.27 |
| | I9 | 6.38 | 7.06 | 7.26 | 7.33 | 7.39 |
| | I10 | 9.91 | 10.51 | 10.42 | 10.27 | 9.81 |
| | I11 | 4.95 | 5.00 | 4.98 | 4.96 | 4.94 |
| | I12 | 6.42 | 6.26 | 6.17 | 6.13 | 6.04 |
| 90 | C3 | 3.56 | 3.85 | 3.98 | 4.04 | 4.11 |
| | I9 | 5.92 | 6.71 | 6.96 | 7.06 | 7.21 |
| | I10 | 9.64 | 10.27 | 10.47 | 10.50 | 10.44 |

TABLE 12-continued

| Temperature | | tan delta (%) | | | | |
|---|---|---|---|---|---|---|
| (° C.) | Compositions | 1 Hz | 100 Hz | 500 Hz | 1000 Hz | 3000 Hz |
| | I11 | 4.74 | 5.00 | 5.02 | 5.01 | 5.00 |
| | I12 | 6.29 | 6.39 | 6.33 | 6.30 | 6.24 |

Table 12 shows that the compositions I9-I12 had a damping clearly greater than that of the composition C3 in the ranges of temperatures and of frequencies of interest, i.e. between 60 and 90° C. and between 1 and 3000 Hz, in particular for the compositions I9, I10 and I12.

Figure 5:
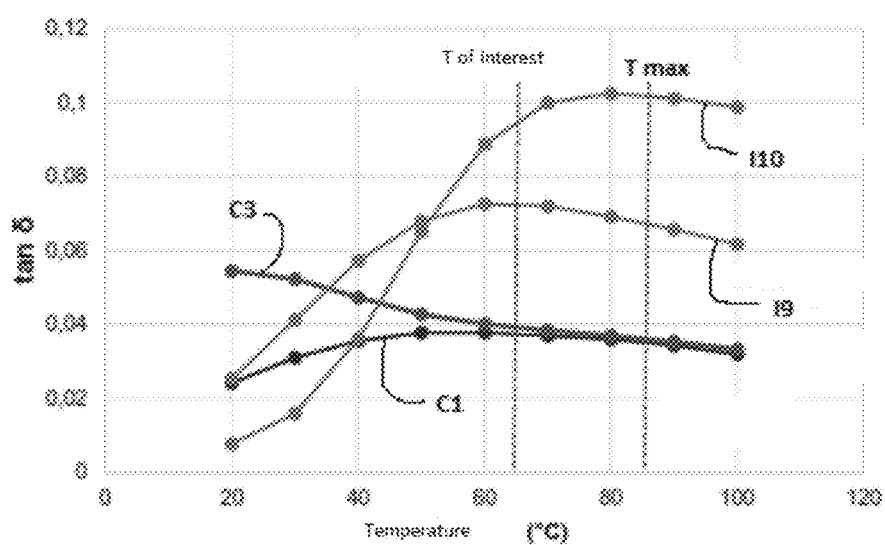
FIG. 5 is a graph showing the damping properties (average tan delta between 1 and 3000 Hz) obtained according to the temperature (° C.) with the apparatus and the mounting of FIG. 1, for the control compositions C1, C3 of the PA6 GF50 type and the compositions according to the invention I9, I10 comprising a PA 6+PA 10T/X alloy, all conditioned under a wet atmosphere according to said RH50 conditioning as defined above.

As illustrated in FIG. 5, it is noted that the composition 19 represents a preferred embodiment of the invention for the use in an electric motor vehicle, because of its temperature at which tan delta is maximum which is approximately 60° C. while having at this temperature a high average value of tan delta between 1 and 3000 Hz. For comparison, the composition 110, although having even higher values of tan delta, had a temperature at which tan delta is maximum of approximately 90° C., a temperature exceeding the usual limit of 85° C. for electric vehicles.

Table 13 below shows the damping compared according to the frequency of the compositions C4 and I13-I16 at the aforementioned four temperatures of 60° C., 70° C., 80° C. and 90° C., after said conditioning in RH50 humidity as defined above.

TABLE 13

| Temperature | | tan delta (%) | | | | |
|---|---|---|---|---|---|---|
| (° C.) | Compositions | 1 Hz | 100 Hz | 500 Hz | 1000 Hz | 3000 Hz |
| 60 | C4 | 4.75 | 5.06 | 5.22 | 5.31 | 5.43 |
| | I13 | 6.71 | 7.27 | 7.31 | 7.28 | 7.22 |
| | I14 | 7.20 | 8.20 | 8.30 | 8.30 | 8.20 |
| | I15 | 8.21 | 8.13 | 7.86 | 7.62 | 7.35 |
| | I16 | 10.24 | 7.26 | 6.31 | 5.94 | 5.51 |
| 70 | C4 | 4.44 | 4.85 | 4.95 | 4.99 | 5.08 |
| | I13 | 6.23 | 6.96 | 7.15 | 7.22 | 7.28 |
| | I14 | 6.54 | 7.70 | 8.03 | 8.14 | 8.28 |
| | I15 | 7.93 | 8.31 | 8.29 | 8.24 | 8.10 |
| | I16 | 11.32 | 9.12 | 8.04 | 7.65 | 6.92 |
| 80 | C4 | 4.07 | 4.62 | 4.76 | 4.81 | 4.88 |
| | I13 | 5.71 | 6.51 | 6.77 | 6.87 | 7.03 |
| | I14 | 5.92 | 7.09 | 7.21 | 7.70 | 7.91 |
| | I15 | 7.65 | 8.13 | 8.26 | 8.30 | 8.32 |
| | I16 | 11.25 | 10.56 | 9.60 | 9.12 | 8.42 |
| 90 | C4 | 3.79 | 4.34 | 4.51 | 4.59 | 4.69 |
| | I13 | 5.07 | 6.17 | 6.41 | 6.51 | 6.68 |
| | I14 | 5.26 | 6.60 | 7.00 | 7.18 | 7.44 |
| | I15 | 7.19 | 7.91 | 8.07 | 8.13 | 8.23 |
| | I16 | 10.78 | 11.28 | 10.76 | 10.37 | 9.77 |

Table 13 shows that the compositions I13-I16 had a damping clearly greater than that of the composition C4 in the ranges of temperatures and of frequencies of interest, i.e. between 60 and 90° C. and between 1 and 3000 Hz, these compositions I13-I16 appearing to be advantageous in particular for their use in the aforementioned linking support in an electric motor vehicle.

The invention claimed is:

1. Thermoplastic polymer composition having properties of damping vibrations in a range of frequencies ranging from 1 Hz to 3000 Hz and at a temperature of 60° C. to 90° C., the composition comprising:

at least one aliphatic polyamide,
at least one polyphthalamide coming at least partly from an aliphatic diamine having from 6 to 12 atoms of carbon and from an aromatic dicarboxylic acid comprising terephthalic acid, said at least one polyphthalamide is chosen from the group consisting of the PA 6T polyamides, the PA 6T/66/6 copolyamides and the PA 10T/X copolyamides, wherein X is at least one other polyamide unit coming from an aliphatic diamine having from 6 to 12 atoms of carbon and from an aromatic dicarboxylic acid comprising terephthalic or isophthalic acid, the weight ratio of said at least one aliphatic polyamide to said at least one polyphthalamide being greater than 1, and
a reinforcing filler comprising glass fibers,
wherein the composition has, after conditioning in air at 50% relative humidity, tan delta values measured by dynamic mechanical analysis according to the standard ISO 6721-5 on rectangular test pieces 34.81 mm long, 4 mm wide and 2 mm thick, by implementing frequency sweeps at a sweeping frequency varying from 0.1 Hz to 20 Hz and with an amplitude of deformation of 2.5 μm,
said tan delta values, obtained by the principle of time-temperature superposition, being maximum at a temperature between 60° C. and 90° C. in said range of frequencies of from 1 Hz to 3000 Hz for damping vibrations, and satisfying at least one of the following conditions (i), (ii), (iii), for at least one frequency of said range of frequencies:
(i) tan delta >4.20% at 60° C.,
(ii) tan delta >4.00% at 80° C.,
(iii) tan delta >3.80% at 90° C.

2. Composition according to claim 1, wherein said values of tan delta further satisfy at least one of the following conditions (ia), (iia), (iiia), both for frequencies of 1 Hz and 3000 Hz:
(ia) tan delta >4.30% at 60° C.,
(iia) tan delta >4.20% at 80° C.,
(iiia) tan delta >3.90% at 90° C.

3. Composition according to claim 2, wherein said values of tan delta further satisfy at least one of the following conditions (ib), (iib), (iiib), both for frequencies of 1 Hz and 100 Hz:
(ib) tan delta >4.80% at 60° C.,
(iib) tan delta >5.00% at 80° C.,
(iiib) tan delta >5.50% at 90° C.,.

4. Composition according to claim 1, wherein the composition has:
at 23° C. after dry as molded (DAM) conditioning, at least one of the following properties measured according to the standard ISO 527:
a Young's modulus>14.7 GPa,
a breaking strength>200 MPa,
an elongation at break>2.1%; and/or
at 120° C. after said dry as molded conditioning (DAM), at least one of the following properties measured according to the standard ISO 527:
a Young's modulus>4.6 GPa,
a breaking strength>80 MPa,
an elongation at break≥2.0%.

5. Composition according to claim 1, wherein the composition has:
at 23° C. after said wet conditioning in air at 50% relative humidity (RH50), at least one of the following properties measured according to the standard ISO 527:
a Young's modulus≥12.0 GPa,
a breaking strength>165 MPa,
an elongation at break≥3.0%; and/or
at 120° C. after said wet conditioning in air at 50% relative humidity (RH50), at least one of the following properties measured according to the standard ISO 527:
a Young's modulus≥4.8 GPa,
a breaking strength≥73 MPa,
an elongation at break>3.5%.

6. Composition according to claim 1, wherein the weight ratio of said at least one aliphatic polyamide to said at least one polyphthalamide is inclusively between 1.1 and 5.0.

7. Composition according to claim 1, wherein the composition comprises according to the following mass fractions with reference to the whole composition:
said at least one aliphatic polyamide according to 20% to 55%,
said at least one polyphthalamide according to 5% to 30%,
said glass fibers according to 20% to 55%.

8. Composition according to claim 1, wherein said reinforcing filler consists of said glass fibers.

9. Composition according to claim 1, wherein the composition is free of any compatibilizing agent.

10. Composition according to claim 1, wherein said at least one aliphatic polyamide is chosen from the group consisting of PA 66, PA 6, PA 11, PA 12, PA 6/66, PA 4.6, PA 5.6, PA 6.9, PA 6.10, PA 6.12, PA 10.10, PA 10.12.

11. Composition according to claim 10, wherein said at least one aliphatic polyamide is a PA 66 and/or a PA 6.

12. Composition according to claim 1, wherein said at least one polyphthalamide is chosen from the PA 10T/X, coming from 1,10-decamethylene diamine and from terephthalic acid and from a unit X coming from an aliphatic diamine having from 6 to 9 atoms of carbon and from terephthalic acid.

13. Composition according to claim 12, wherein said at least one polyphthalamide consists of a PA 10T/X with X chosen from PA 6T and PA 6-3-T, where PA 6-3-T is defined by the formula below:

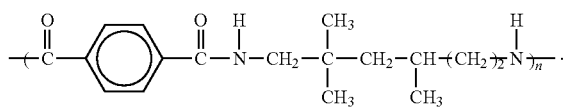

14. Composition according to claim 13, wherein said at least one polyphthalamide consists of a PA 10T/PA 6-3-T, with a PA 10T:PA 6-3-T molar ratio inclusively between 1.1 and 10.

15. Composition according to claim 14, wherein said at least one polyphthalamide consists of a PA 10T/PA 6-3-T having a number-average molecular weight measured by GPC between 10000 and 12000 g/mol, with said PA 10T:PA 6-3-T molar ratio inclusively between 1.2 and 2.

16. Composition according to claim 14, wherein said at least one polyphthalamide consists of a PA 10T/PA 6-3-T having a number-average molecular weight measured by GPC between 12000 and 14000 g/mol, with said PA 10T:PA 6-3-T molar ratio inclusively between 8 and 10.

17. Composition according to claim 13, wherein said at least one polyphthalamide consists of a PA 10T/PA 6T, with a PA 10T:PA 6T molar ratio inclusively between 8 and 10.

18. Composition according to claim 1, comprising the product of a melt mixing of said at least one aliphatic polyamide, said at least one polyphthalamide and said reinforcing filler, by extrusion.

19. Method for preparing a composition according to claim 1, wherein melt mixing, in an extruder of said at least one aliphatic polyamide, said at least one polyphthalamide and said reinforcing filler is implemented, without using a compatibilizing agent.

20. Method according to claim 19, wherein a step of premixing said at least one aliphatic polyamide and said at least one polyphthalamide is implemented before introducing into the extruder said reinforcing filler.

21. Device with dynamic operation for a motor vehicle, the device being capable of damping vibrations in a range of frequencies ranging from 1 to 3000 Hz and at a temperature of 60 to 90° C., wherein the device comprises a composition according to claim 1.

22. Device according to claim 21 for a motor vehicle with a heat, hybrid or electric engine, wherein the device is chosen from the structural parts transmitting vibrations from the wheels of the vehicle, and the anti-vibration supports combining first and second rigid elements while damping vibrations between them and while supporting a load.

23. Composition according to claim 6, wherein the weight ratio of said at least one aliphatic polyamide to said at least one polyphthalamide is inclusively between 1.5 and 4.5.

24. Composition according to claim 7, wherein the composition comprises according to the following mass fractions with reference to the whole composition:
said at least one aliphatic polyamide according to 25% to 50%,
said at least one polyphthalamide according to 10% to 27%,
said glass fibers according to 25% to 50%.

25. Composition according to claim 9, wherein the composition is free of any polyolefin and of any polyether.

26. Composition according to claim 25, wherein the composition consists of said at least one aliphatic polyamide, said at least one polyphthalamide and said reinforcing filler.

27. Composition according to claim 13, wherein said at least one polyphthalamide consists of a PA 10T/X with X chosen from PA 6T and PA 6-3-T, with a PA 10T:X molar ratio greater than 1.

28. Composition according to claim 15, wherein said at least one polyphthalamide consists of a PA 10T/PA 6-3-T having a number-average molecular weight measured by GPC between 10700 and 11700 g/mol, with said PA 10T:PA 6-3-T molar ratio inclusively between 1.3 and 1.7.

29. Composition according to claim 16, wherein said at least one polyphthalamide consists of a PA 10T/PA 6-3-T having a number-average molecular weight measured by GPC between 12500 and 13500 g/mol, with said PA 10T:PA 6-3-T molar ratio inclusively between 8.5 and 9.5.

30. Composition according to claim 17, wherein said at least one polyphthalamide consists of a PA 10T/PA 6T, with a PA 10T:PA 6T molar ratio inclusively between 8.5 and 9.5.

31. Device with dynamic operation according to claim 21, wherein the device is free of any metal part, the device consisting of said composition injection molded.

32. Device with dynamic operation according to claim 21, wherein the device consists of said composition injection molded that is rigidly connected to a metal insert.

33. Device according to claim 22 for a motor vehicle with a heat, hybrid or electric engine, wherein the device is an anti-vibration support which is a linking support connecting the engine to an element of the structure of the vehicle.

34. Device according to claim 33, wherein the motor vehicle has a body and said element of the structure of the vehicle is the body of the vehicle.

* * * * *